INVENTORS.
ALAN DAVISON.
NORMAN HUTTON ROBINSON.
BY
Lippincott & Smith
ATTORNEYS.

June 15, 1954
Filed June 13, 1949

A. DAVISON ET AL
ELECTRICAL SIGNALING SYSTEM USING
NONLINEAR RESISTORS FOR CONTROL 2,681,386
3 Sheets-Sheet 2

INVENTORS.
ALAN DAVISON.
NORMAN HUTTON ROBINSON.
BY
Lippincott & Smith
ATTORNEYS.

June 15, 1954

A. DAVISON ET AL
ELECTRICAL SIGNALING SYSTEM USING
NONLINEAR RESISTORS FOR CONTROL 2,681,386

Filed June 13, 1949

3 Sheets-Sheet 3

INVENTORS
ALAN DAVISON
NORMAN HUTTON
BY
Lippincott & Smith.
ATTORNEYS

Patented June 15, 1954 2,681,386

UNITED STATES PATENT OFFICE 2,681,386

ELECTRICAL SIGNALING SYSTEM USING NONLINEAR RESISTORS FOR CONTROL

Alan Davison and Norman Hutton Robinson, Liverpool, England, assignors to Automatic Telephone & Electric Company Limited, Liverpool, England, a British company Application June 13, 1949, Serial No. 98,696

Claims priority, application Great Britain July 13, 1948

14 Claims. (Cl. 179—84)

Figure 1:
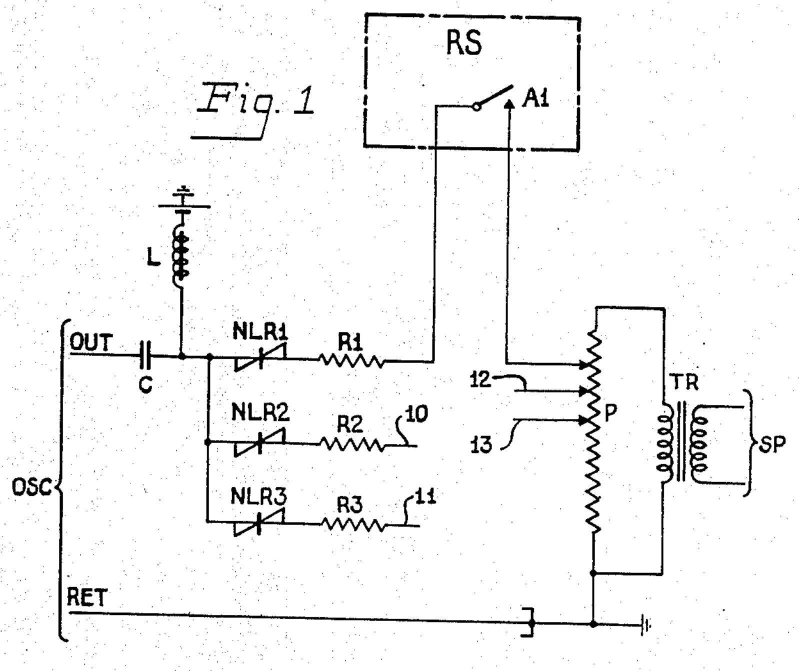

The present invention relates to electrical signalling systems and is more particularly concerned with circuit arrangements for controlling one or more oscillation generators for use in transmitting signals over at least one signal path.

For a number of reasons, it is desirable that the oscillation generator or generators should be continuously operating and should be permanently connected to the signal path and the main object of the invention is to provide simple circuit arrangements whereby this may be done.

According to one feature of the invention, in circuit arrangements for controlling one or more oscillation generators for use in transmitting signals over at least one signal path, an oscillation generator permanently connected to a signal path is arranged to operate continuously and the flow of current from the generator to the signal path is prevented by the use of at least one non-linear resistor, the operation of contact means serving to bias said non-linear resistor or resistors in such a manner as to reduce their impedance and thereby render them conducting to alternating currents.

The invention may be applied to systems of different types in one of which alternating currents of separate frequencies are transmitted over a single signal path while in another system alternating currents of a single frequency may be transmitted over any of a plurality of signal paths.

According therefore to another feature of the invention in circuit arrangements for use in electrical signalling systems employing alternating currents of separate frequencies transmitted over a single signal path, a plurality of continuously operating oscillation generators are connected in parallel to the single path and the flow of current from said generators to said path is normally prevented by the use of non-linear resistors, the operation of contact means serving to bias the non-linear resistor or resistors associated with one of said generators in such a manner as to reduce the impedance thereof to enable current to flow from said generator to said path.

According to a further feature of the invention, in circuit arrangements for use in electrical signalling systems employing alternating currents of a single frequency transmitted over a plurality of signal paths, a continuously operating oscillation generator is connected in parallel to all said paths and the flow of current from said generator to said paths is normally prevented by the use of non-linear resistors, the operation of contact means serving to bias the non-linear resistor or resistors associated with one of said paths in such a manner as to reduce the impedance thereof to enable current to flow from said generator to said path.

Alternatively the invention may be applied to a system in which alternating currents of a plurality of separate frequencies are transemitted over a plurality of signal paths and a particular example of such a system is a telephone system using alternating current signals for setting up connections. One trend of present day practise in the setting up of telephone connections is to employ separate signal paths and speech circuits, one signal path serving a group of speech circuits while discrimination between the speech circuits on the signal path is effected on a frequency basis.

One signalling arrangement of this type involves the use of a group of oscillation generators for generating the different frequency alternating currents, and connecting the oscillation generators to the various signal paths over a circuit which includes normally open contacts of the appropriate signal relays.

It has been found that this arrangement while satisfactory in most respects suffers from the disadvantage that unwanted frequencies appear in the signal paths even when the contacts of the associated signalling relays are open, due probably to capacitative coupling between adjacent conductors in the leads between the oscillation generators of the unrequired frequencies and the contacts of the associated signalling relays and also to the interconnections between the contacts themselves.

The invention may be applied to avoiding this disadvantage and according to a further feature of the invention in circuit arrangements for use in telephone systems employing separate signal paths and speech circuits, one signal path serving a group of speech circuits while discrimination between the speech circuits on a signal path is effected by employing alternating currents of separate frequencies, a plurality of continuously operating oscillation generators are provided and each generator is connected in parallel to all the signal paths, the connection to each signal path including at least one non-linear resistor which prevents current flow from the generator to the path while contact means associated with each speech circuit are arranged when operated to bias the non-linear resistor in the connection between the appropriate generator and the signal path serving the speech circuit in such a manner that the impedance of the non-linear resistor is reduced thereby allowing current flow from the generator to the path.

In one embodiment of the invention, the output terminals of an oscillation generator are connected to a signal path through a circuit which includes a non-linear resistor in series with a normally open signalling contact, the output of said generator being fed to the path upon the closure of the contact.

In another embodiment of the invention, the output from an oscillation generator is fed to a signal path through a two-wire circuit having a non-linear resistor in each wire while a normally-open signalling contact is connected in balanced relation to said circuit and is adapted to control the bias to the non-linear resistors but does not carry any signalling current.

In a further embodiment of the invention, the output from an oscillation generator is fed to a signal path through two two-wire circuits having a non-linear resistor in each wire and arranged in opposition with their outgoing ends connected in parallel, a normally-open signalling contact connected in balanced relation to one of said two wire circuits being adapted to control the bias to the non-linear resistors included in said two-wire circuit without carrying any signalling current.

Figure 2:
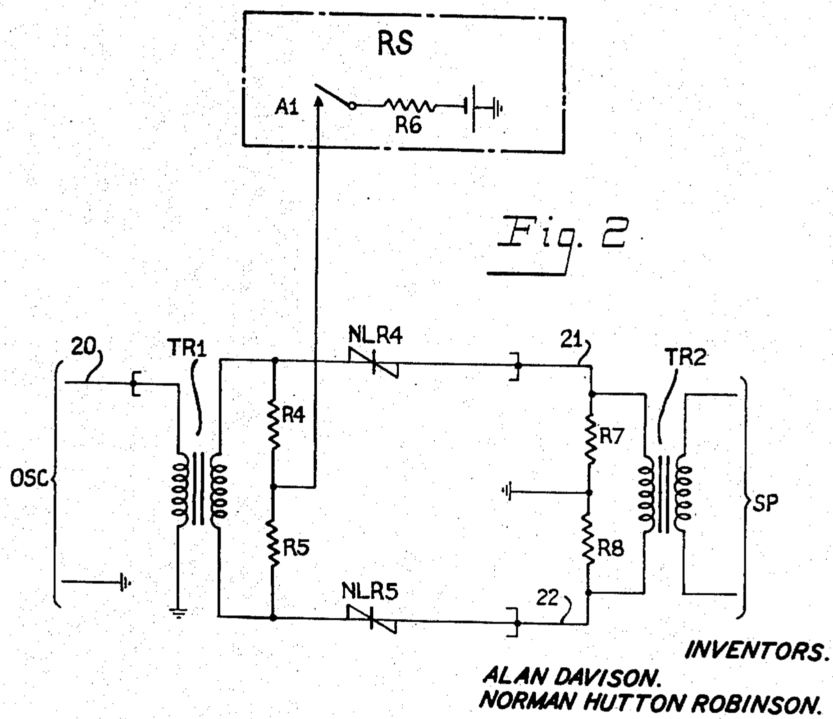
Figure 3:
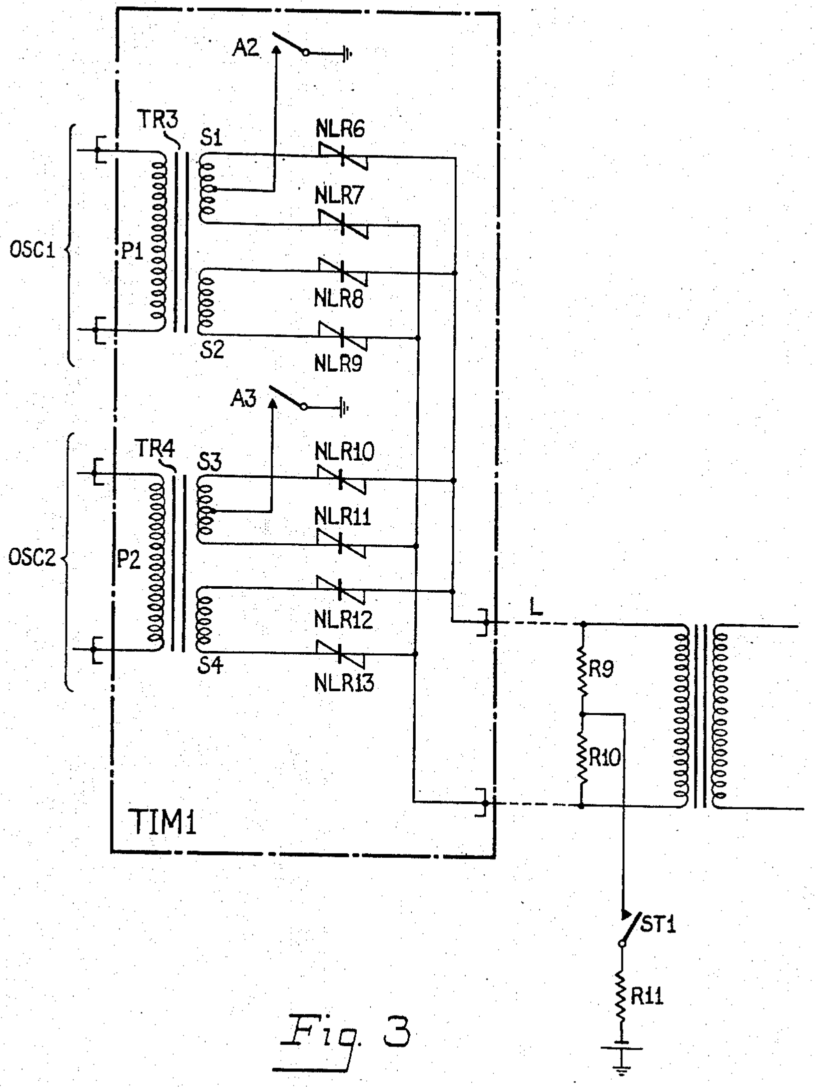
Figure 4:
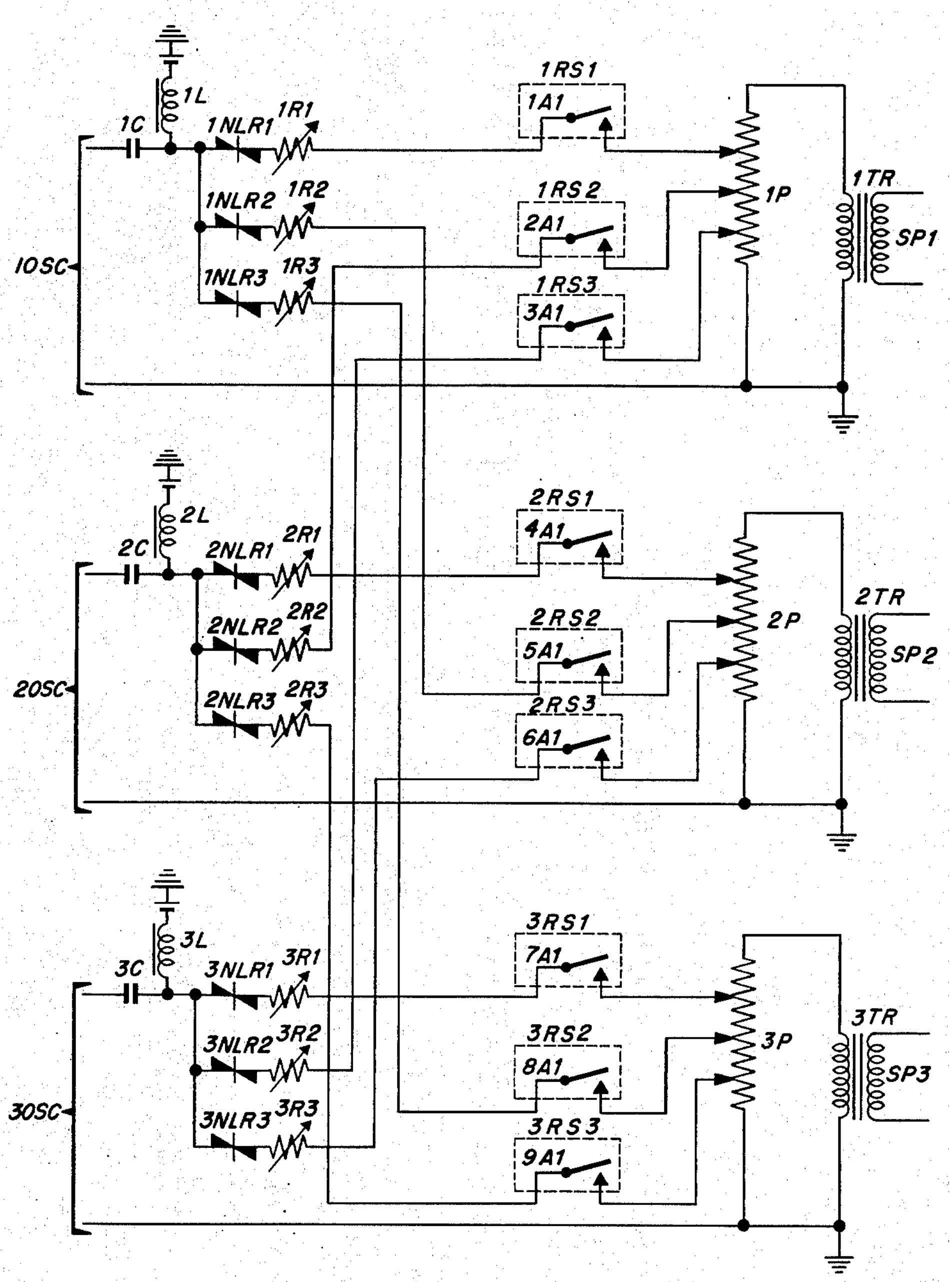

The invention will be better understood from the following description of several embodiments taken in conjunction with the accompanying drawings comprising Figs. 1, 2 and 3, each of which shows a different embodiment of the invention; and Fig. 4 which shows the invention as embodied in a three-signal path operation.

The circuit of Fig. 1 shows the invention applied to a system in which alternating currents of a plurality of separate frequencies are transmitted over a plurality of signal paths. It will, however, be understood that if the leads 12 and 13 and the common return are removed, the circuit will show the invention applied to a system in which alternating current of a single frequency is transmitted over a plurality of signal paths while if leads 10 and 11 and their associated linear and non-linear resistors R2, NLR2 and R3, NLR3 respectively are removed, the circuit will show the invention applied to a system in which alternating current of separate frequencies are transmitted over a single signal path. Further if leads 12, 13 and the common and leads 10 and 11 are removed the circuit will show the invention applied to a system in which alternating current of a single frequency is transmitted over a single signal path.

The particular use of the circuit shown in Fig. 1 is to a telephone system having separate signal paths and speech circuits, one signal path being provided for 20 speech circuits while discrimination between the speech circuits on the signal path is effected on a frequency basis so that 20 oscillation generators are necessary. The circuit shows the output circuit of one oscillator only and sufficient of the remainder of the equipment to enable the invention to be understood.

The output of the oscillator is fed over lead Out and the D. C. blocking condenser C to the parallel-connected variable resistors R1, R2 and R3 each of which is in series with a non-linear resistor NLR1, NLR2 and NLR3. The other side of the non-linear resistor NLR1 is connected via a contact A1 of the signalling relay to the voltage divider P, the lower end of which is grounded. The signalling relay forms part of the relay set associated with the speech circuit to which has been allocated the frequency which is fed over lead Out. Similarly the non-linear resistors NLR2 and NLR3 are connected via leads 10 and 11 to the contacts of signalling relays associated with speech circuits which are allocated the same frequency but which use different signal paths. Connections will also be made to the voltage divider P from the contacts of signalling relays associated with speech circuits served by the same signal path.

The biasing means for the non-linear resistors consists of the battery connected to the lead Out through the choke L. In operation with the signalling relay contact A1 open, no biasing circuit exists for NLR1 and its impedance is of a sufficiently high value as to effect virtual disconnection of the oscillator. When the signalling contact A1 is closed, the biasing circuit is completed from battery, choke L, resistor R1, non-linear resistor NLR1, contact A1, voltage divider P to earth. The current flow over this circuit reduces the impedance of the non-linear resistor and the alternating current is able to pass to the signal path. It will thus be seen that the virtual disconnection of the oscillator when the non-linear resistor or resistors are unbiased will reduce any possibility of capacitive coupling between adjacent leads and hence reduce the possibility of interference.

The variable resistors R1, R2 and R3 take account of the variations in the characteristics of the non-linear resistors in order to maintain a substantially constant de-coupling resistance in the signalling condition and also act as limiting resistances so that on closure of an associated signalling contact the current surge is insufficient to cause a surge to be transmitted over the signal path. For convenience of adjustment the variable resistors and the non-linear resistors are mounted adjacent to the oscillator.

The choke L may, if desired, form part of a tuned circuit which presents a high impedance to the frequency to be transmitted while presenting a low impedance path to the other frequencies so that the latter frequencies are prevented from being effective on other signal paths by way of biased non-linear resistors serving those paths.

The above described embodiment is shown in greater detail in Fig. 4 where three signal paths SP1, SP2 and SP3 are shown together with three oscillators 1OSC, 2OSC and 3OSC. The output from any one of the three oscillators may be applied to any of the signal paths under the control of contacts 1A1 to 9A1 inclusive, these contacts being part of relay sets 1RS1 to 1RS3, 2RS1 to 2RS3 and 3RS1 to 3RS3, these relay sets being associated with different speech paths. Thus the nine speech paths make use of three signal paths and the outputs from the three oscillators are applied to all the signal paths in order to provide a discrimination on a frequency basis.

Considering the circuit in more detail, the non-linear resistors 1NLR1, 1NLR2 and 1NLR3 are controlled by contacts 1A1 associated with relay set 1RS1, contacts 5A1 associated with relay set 2RS1 and contacts 8A1 associated with relay set 3RS2. Thus the closure of any of these three contacts enables the output of the oscillator 1OSC to be applied to the appropriate one of the three signal paths. Similarly, the non-linear resistors 2NLR1, 2NLR2 and 2NLR3 are controlled by contacts 4A1, 2A1 and 9A1 respectively so that the output from the oscillator 2OSC may be applied to any of the signal paths. The arrangement of the non-linear resistors 3NLR1, 3NLR2 and 3NLR3 connected in the output of the oscillator 3OSC is again similar and the resistors are controlled by contacts 7A1, 3A1 and 9A1 respectively. The source of biasing potential is connected to the non-linear resistors over the chokes 1L, 2L and 3L and the output circuit of the oscillators includes the capacitors 1C, 2C and 3C. The outputs from the oscillators are taken to different tapping points on potentiometers 1P, 2P and 3P and these are associated with the signal paths over transformers 1TR, 2TR and 3TR.

The above described embodiment while giving improved operation with respect to known arrangements is still not entirely free from disturbance due to pick-up troubles between the leads. Further the opening and closing of the signalling contact causes a current surge which may reach a disturbing level to be transmitted over the signal path. To avoid these troubles, the circuit shown in Fig. 2 was devised.

In this circuit, a V. F. oscillator OSC is connected over the common lead 20 to transformer TR1 being one of a plurality of transformers each serving an associated signal path. Resistors R4 and R5 connected across the secondary winding are substantially equal in value and extend at their common point to the signalling relay contact A1 and resistor R6 in the relay set RS. The secondary winding of transformer TR1 also extends by way of non-linear resistors NLR4 and NLR5 having substantially similar characteristics and being normally of very high resistance value, to the primary winding of transformer TR2. This transformer connects with the signal path SP which is common to a plurality of speech paths. The primary winding of transformer TR2 is shunted by resistors R7 and R8 which are of substantially equal value and are connected at their common point to earth.

When relay contact A1 is closed negative battery at resistor R6 is extended to bias the-linear resistors NLR4 and NLR5 which considerably and instantaneously reduce in value to permit the V. F. signal to be applied to the signal path. It will be noted that D. C. voltage appearing across the secondary winding of TR1 and the primary winding of TR2 remains substantially zero since the circuit is balanced and consequently no surge is evident in the transformers. Further no signalling current flows over contact A1 when this contact is closed whereby any pick-up trouble on the leads to the contact is avoided.

Common leads 21 and 22 extend to other sources of V. F. current which may be applied to the signal path in a similar manner.

It will be apparent that similar results may be obtained if resistors R4 and R5 were omitted and contacts A1 extended to a centre tapped secondary winding of transformer TR1. Likewise resistors R7 and R8 may also be dispensed with where a ground connection is made to the midpoint by a centre tapped primary winding of transformer TR2.

It might be mentioned that a plurality of transformers such as TR1 may be replaced by a transformer having several secondary windings, each secondary winding working to a different signal path.

In the above embodiments the invention is applied to an alternating current system in which the signalling frequencies are within the voice frequency range. It may also be applied to carrier current systems when the frequencies of the signal currents may have any desired value and will usually be transmitted over a separate signal path by modulation of a suitable carrier frequency, the carrier equipment being arranged to the right of the transformer TR (Fig. 1) or TR2 (Fig. 2).

In addition there are other signalling arrangements to which the invention may be applied. For instance it is the practice in automatic totalisators to provide signal paths between groups of ticket-issuing machines and the totalisator which is located at a central point. These signal paths are for the purpose of signalling changes in the stake money from the ticket issuing machines to the totalisator and hitherto signalling has been effected on a D. C. basis. It will be understood however that A. C. signalling may be employed and here again the same problem of preventing interference occurs and the circuit shown in Fig. 3 has been devised to provide a solution. This circuit also incorporates additional safeguards which are not shown in the circuits of Figs. 1 and 2 but it will readily be appreciated that they may be applied thereto.

Six frequencies may be employed for signalling purposes and in Fig. 3 the output transformers TR3 and TR4 for two oscillators OSC1 and OSC2 only are shown. These frequencies may be transmitted over the line either separately or in combination to form a code by operation of contacts such as A2 and A3. The equipment within the dotted rectangle TIM1 is provided for each ticket issuing machine and there may be as many as 200 of these machines directly connected to the totalisator. The transformers each have two secondary windings, the two leads from each winding each including a non-linear resistor. The non-linear resistors associated with one only of the transformers have a bias applied thereto when the signalling contact is closed provided the start contact ST1 is also closed. The non-linear resistors associated with the other secondary winding are always maintained at a high resistance value. The ratio between the primary winding for instance P1 of TR3 to the two secondary windings S1 and S2 is the same and the windings S1 and S2 are arranged in opposition.

In the normal condition the start contact ST1 will be open so that even if the signal contacts A2 and A3 are closed, none of the non-linear resistors NLR7, NLR6, NLR10 and NLR11 will be biased. The output from the oscillator OS1 will thus be fed over S1 and S2 but since these are wound oppositely and the non-linear resistors have similar characteristics, only a very small amount of the output will reach the line L.

Assuming that signal contact A1 is closed when the start contact ST1 is closed at the totalisator end of the line L, the non-linear resistors NLR6 and NLR7 will be biased to a low value but NLR8 and NLR9 will be maintained at their high value. The output of OSC1 will thus be fed to the line at a suitable level to give an indication at the other end.

The purpose of the secondary windings such as S2 and S4 is to prevent feedback between the commoned transformer secondaries. Thus the signal from OSC1 may pass not only to the line L but also through the non-linear resistors NLR10 to NLR13, secondary windings S3 and S4 to P2 and thence via a transformer such as TR4 to the totalisator over another line. The presence of the additional secondary winding together with the fact that the two secondary windings are in opposition reduces this feedback to negligible proportions.

We claim:

1. In an electrical signalling system, circuit arrangements comprising a continuously-operating oscillation generator, a plurality of signal paths, means feeding the output of said generator to said signal paths, said means including at least one high-valued non-linear resistor for each signal path, a source of biasing voltage, and contact-making means associated with said non-linear resistor for applying the biasing voltage to said non-linear resistor to reduce the value thereof thereby to enable the output of said generator to be fed to the signal path associated with said biased non-linear resistor.

2. In an electrical signalling system, circuit arrangements comprising a plurality of continuously-operating oscillation generators, a signal path, means feeding the outputs of said generators to said path, said means including at least one high-valued non-linear resistor for each of said generators, a source of biasing voltage, for each non-linear resistor and contact-making means for applying the biasing voltage to at least one of said non-linear resistors to reduce the value thereof thereby to enable the output of the generator associated with said biased non-linear resistor to be fed to said signal path.

3. In an electrical signalling system, circuit arrangements comprising a continuously-operating oscillation generator, an output circuit for said generator, a plurality of signal paths, a plurality of normally-open connecting paths for connecting said output circuit to said signal paths, each said connecting path including a high-valued non-linear resistor and contact-making means, a source of biasing voltage common to all said connecting paths, closure of one of said contact-making means serving to apply said source to the non-linear resistor associated with said closed contact-making means thereby to reduce the value of the non-linear resistor to close the connecting path between said output circuit and one of said signal paths.

4. In an electrical signalling system, circuit arrangements comprising a continuously-operating oscillation generator, a plurality of signal paths, a plurality of output circuits for said generator one for each signal path, a plurality of normally-open two-wire connecting paths each for connecting an output circuit to a signal path, each said connecting path including a high-valued non-linear resistor in each wire thereof, a source of biasing voltage for each connecting path and contact-making means for each connecting path arranged in balanced relation thereto for applying said source to the associated non-linear resistors to reduce the value thereof thereby to close the connecting path between one of said output circuits and the associated signal path.

5. In an electrical signalling system, circuit arrangements comprising a plurality of continuously-operating oscillation generators, a signal path, an output circuit for each said generator, a normally-open connecting path between each output circuit and said signal path, each said connecting path including a high-valued non-linear resistor and contact-making means, a source of biasing voltage for each connecting path, closure of said contact-making means serving to apply said source to said non-linear resistor to reduce the value thereof thereby to close said connecting path between one of said generators and said signal path.

6. In an electrical signalling system, circuit arrangements comprising a plurality of continuously-operating oscillation generators, a signal path, an output circuit for each said generator, a normally-open two-wire connecting path between each output circuit and said signal path, each said connecting path including a high-valued non-linear resistor in each wire thereof, a source of biasing voltage for each connecting path and contact-making means for each connecting path arranged in balanced relation thereto for applying said source to the associated non-linear resistors to reduce the value thereof thereby to close the connecting path between one of said output circuits and said signal path.

7. Circuit arrangements as claimed in claim 6 wherein a second two-wire path is associated with each connecting path, said second path being connected in opposition to said first connecting path and including two high-valued non-linear resistors unaffected by said biasing voltage.

8. In an electrical signalling system, circuit arrangements comprising a plurality of continuously-operating oscillation generators, a plurality of signal paths, a plurality of normally-open connecting paths for feeding the output from said generators to said signal paths, said connecting paths including at least one high-valued non-linear resistor, a source of biasing voltage, and contact-making means associated with each connecting path, closure of said contact-making means serving to apply said source to said non-linear resistor to reduce the value thereof thereby to close the connecting path between one of said generators and one of said signal paths.

9. In an electrical signalling system, circuit arrangements comprising a plurality of continuously-operating oscillation generators, a plurality of signal paths, an output circuit for each of said generators, a plurality of normally-open connecting paths for connecting each output circuit to all said signal paths, said connecting paths including a high-valued non-linear resistor and contact-making means, a source of biasing voltage common to the connecting paths for one output circuit, closure of said contact-making means serving to apply said source to said non-linear resistors to reduce the value thereof thereby to close the connecting paths between said generators and said signal paths.

10. Circuit arrangements as claimed in claim 9 and comprising a transformer for coupling the connecting paths from each of said generators to a signal path and a potential divider connected across the primary winding of said transformer, the connecting paths from different generators being connected to different tapping points on said potential divider.

11. In an electrical signalling system, circuit arrangements comprising a plurality of continuously-operating oscillation generators, a plurality of signal paths, a plurality of output circuits for each generator corresponding in number to the number of signal paths, a plurality of normally-open two-wire connecting paths for connecting each output circuit to a signal path, a high-valued non-linear resistor connected in each wire of said connecting paths, a source of biasing voltage for each connecting path and contact-making means for each connecting path arranged in balanced relation thereto for applying said source to the associated non-linear resistors to reduce the value thereof thereby to close the connecting path between the output circuit and the signal path associated with the connecting path.

12. Circuit arrangements as claimed in claim 11 and comprising a first transformer for coupling an output circuit to a connecting path and a second transformer for coupling said connecting path to a signal path, said contact-making means and said source of biasing voltage comprising a circuit extending from the electrical mid-point of the secondary winding of said first transformer and of the primary winding of said secondary transformer.

13. In a telephone system employing voice frequency signals for setting up connections, a plurality of speech channels, a plurality of signal paths each serving more than one of said speech channels, a plurality of continuously-operating oscillation generators equal in number to the number of speech circuits served by each signal path, an output circuit for each of said generators, a plurality of normally-open connecting paths for connecting each output circuit to all of said signal paths, said connecting paths each including a high-valued non-linear resistor, a source of biasing voltage common to the connecting paths for each output circuit and contact-making means also included in each of said connecting paths, each contact-making means forming part of the associated speech channel and operating to apply said source to the non-linear resistor in the associated connecting path to reduce the value thereof thereby to close the connnecting path.

14. In a telephone system employing voice frequency signals for setting up connections, a plurality of speech channels, a plurality of signal paths each serving more than one of said speech channels, a plurality of continuously-operating oscillation generators equal in number to the number of speech circuits served by each signal path, a plurality of output circuits for each of said generators equal in number to the number of signal paths, a plurality of normally-open two-wire connecting paths for connecting each output circuit to the corresponding signal path, a high-valued non-linear resistor connected in each wire of the connecting paths, a source of biasing voltage for each connecting path and contact-making means for each connecting path arranged in balanced relation thereto and forming part of the associated speech channel, said contact-making means upon operating applying said source to the non-linear resistors in the associated connecting path to reduce the value thereof thereby to close the connecting path.

References Cited in the file of this patent

UNITED STATES PATENTS

| Number | Name | Date |
|---|---|---|
| 1,883,613 | Devol | Oct. 18, 1932 |
| 2,139,249 | Welch | Dec. 6, 1938 |
| 2,286,069 | Den Hertog | June 9, 1942 |
| 2,290,570 | Paddle | July 21, 1942 |
| 2,319,306 | Dickieson | May 18, 1943 |
| 2,336,768 | Six | Dec. 14, 1943 |
| 2,463,597 | Cahill | Mar. 8, 1949 |
| 2,492,320 | Riggen | Dec. 27, 1949 |
| 2,511,468 | Harrison | June 13, 1950 |
| 2,541,039 | Cole | Feb. 13, 1951 |